US008687624B2

(12) United States Patent
Kumarasamy et al.

(10) Patent No.: US 8,687,624 B2
(45) Date of Patent: Apr. 1, 2014

(54) APPARATUS AND METHOD TO HANDLE DYNAMIC PAYLOADS IN A HETEROGENEOUS NETWORK

(75) Inventors: Parameswaran Kumarasamy, San Jose, CA (US); Kavithadevi Parameswaran, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1288 days.

(21) Appl. No.: 12/030,759

(22) Filed: Feb. 13, 2008

(65) Prior Publication Data

US 2009/0201910 A1     Aug. 13, 2009

(51) Int. Cl.
*H04L 12/66* (2006.01)

(52) U.S. Cl.
USPC .......................................... 370/352

(58) Field of Classification Search
USPC ......... 370/352, 401, 235, 248, 252, 392, 389; 379/219; 455/450; 709/227
See application file for complete search history.

(56) References Cited

U.S. PATENT DOCUMENTS

| | | | | |
|---|---|---|---|---|
| 6,885,658 | B1 * | 4/2005 | Ress et al. ..................... | 370/352 |
| 7,139,270 | B1 * | 11/2006 | Fatehi et al. ................... | 370/352 |
| 7,167,451 | B1 * | 1/2007 | Oran ............................. | 370/252 |
| 7,623,507 | B2 * | 11/2009 | Hocevar et al. ............... | 370/352 |
| 7,668,306 | B2 * | 2/2010 | Strathmeyer et al. ......... | 379/219 |
| 2004/0174874 | A1 * | 9/2004 | Saito et al. ..................... | 370/389 |
| 2005/0157701 | A1 * | 7/2005 | Hoffmann et al. ............ | 370/352 |
| 2006/0291483 | A1 * | 12/2006 | Sela .............................. | 370/401 |
| 2007/0002840 | A1 * | 1/2007 | Song et al. .................... | 370/352 |
| 2007/0060163 | A1 * | 3/2007 | Jabri et al. .................... | 455/450 |
| 2007/0201367 | A1 * | 8/2007 | Chen et al. .................... | 370/235 |
| 2007/0266161 | A1 * | 11/2007 | Kenrick et al. ............... | 709/227 |
| 2007/0297339 | A1 * | 12/2007 | Taylor et al. .................. | 370/248 |
| 2008/0186952 | A1 * | 8/2008 | Lin et al. ....................... | 370/352 |

OTHER PUBLICATIONS

Singh et al. ,Interworking between SIP/SDP and H.323, Jan. 10, 2000,Internet Engineering Task Force.*
P.Hallin et al., NAT-PT DNS ALG solution, Jul. 24, 2002, Network Working group.*

* cited by examiner

*Primary Examiner* — Asad Nawaz
*Assistant Examiner* — Parth Patel
(74) *Attorney, Agent, or Firm* — Schwegman Lundberg & Woessner, P.A.

(57) ABSTRACT

Various embodiments provide an apparatus and method for handling dynamic payloads in a heterogeneous network. An example embodiment includes a first node interface to receive a first request for data communication from a first node, the first request being coded in a first protocol and including information identifying a first payload type. The example embodiment includes a second node interface to receive a second request for data communication from a second node, the second request being coded in a second protocol and including information identifying a second payload type. The first node interface of the example embodiment configures a message coded in the first protocol to include the information identifying the second payload type and to send the message to the first node.

12 Claims, 6 Drawing Sheets

APPARATUS AND METHOD TO HANDLE DYNAMIC PAYLOADS IN A HETEROGENEOUS NETWORK

TECHNICAL FIELD

The disclosed subject matter relates to the field of network communications, and more particularly to voice over Internet Protocol (VoIP) communications.

BACKGROUND

Voice over Internet Protocol (VoIP) is being increasingly used by customers for local, long distance and international calls. The Session Initiation Protocol (SIP) is a well-known VoIP (signaling) protocol for creating, modifying, and terminating sessions with one or more participants. These sessions include Internet telephone calls, multimedia distribution, and multimedia conferences.

With the popularity of VoIP and increasing deployments of VoIP interconnections, there is a strong need for internetworking various protocols, such as SIP, H.323, H.320, and H.324. Internetworking H.323 and SIP protocols has been achieved as specified in well-known standards documents (e.g. RFC4123) for basic connections. However, payload handling for internetworking these various VoIP protocols is not described in these standards documents. Payload handling for internetworking various VoIP protocols has become increasingly critical as more and more systems use dynamic payloads, such as new audio and video codecs.

Conventional SIP specifies the payload in the receiving direction in session description protocol (SDP). However, conventional H.323/H.320/H.324 protocols specify the payload in the transmitting direction. This payload handling mismatch causes interoperability problems when attempts are made to internetwork SIP and H.323/H.320/H.324 protocols. This is a common problem in all H.323/H.320/H.324 to SIP internetworking devices, such as time division multiplexed (TDM) gateways (H.324/H.320-SIP), session border controllers (SBC), Internet Protocol (IP) to IP gateways, Call Manager and Call Manager Express brand devices manufactured by Cisco Systems, Inc., Broadband Telephony Services (BTS), and the like.

Thus, an apparatus and method for handling dynamic payloads in a heterogeneous network are needed.

DETAILED DESCRIPTION

In the following detailed description, reference is made to the accompanying drawings that form a part hereof, and in which are shown, by way of illustration, specific embodiments in which the disclosed subject matter can be practiced. It is understood that other embodiments may be utilized and structural changes may be made without departing from the scope of the disclosed subject matter.

Overview

As described further below, according to various example embodiments of the disclosed subject matter described herein, there is provided an apparatus and method for handling dynamic payloads in a heterogeneous network. An example embodiment includes a first node interface to receive a first request for data communication from a first node, the first request being coded in a first protocol and including information identifying a first payload type. The example embodiment includes a second node interface to receive a second request for data communication from a second node, the second request being coded in a second protocol and including information identifying a second payload type. The first node interface of the example embodiment configures a message coded in the first protocol to include the information identifying the second payload type and to send the message to the first node.

Figure 1:
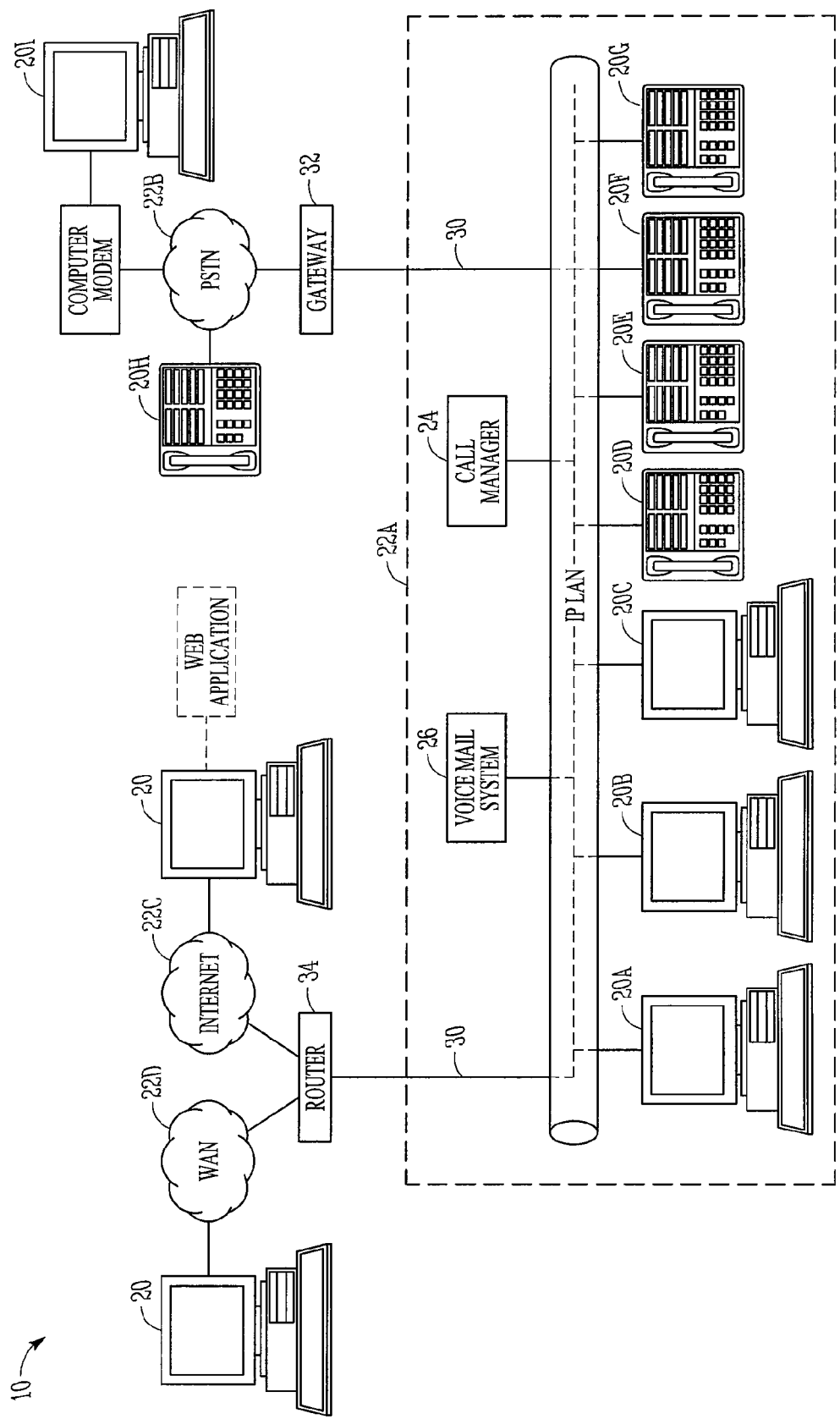
FIG. 1 illustrates a VoIP network environment in which various embodiments can operate.

FIG. 1 illustrates an example of a communications system 10 for implementing a voice-over-Internet Protocol (VoIP) system. Communications system 10 includes a plurality of endpoints 20 (also including endpoints 20a-20i) having the ability to establish communication sessions with each other, using one or more of communication networks 22a-22d. Communications system 10 also includes one or more call managers 24 that cooperate with a voice mail system 26 to manage incoming calls and other communications for endpoints 20. In the illustrated embodiment, communications system 10 includes a local area network (LAN) 22a, a Public Switched Telephone Network (PSTN) 22b, a public network (e.g. Internet) 22c, and a wide area network (WAN) 22d, which cooperate to provide communication services to the variety of types of endpoints 20 within communications system 10. Specifically, LAN 22a couples multiple endpoints 20a-20g for the establishment of communication sessions between endpoints 20a-20g and other endpoints 20 distributed across multiple cities and geographic regions. Generally, LAN 22a provides for the communication of packets, cells, frames, or other portions of information (generally referred to as packets herein) between endpoints 20. Accordingly, LAN 22a may include any combination of network components, gatekeepers, call managers, routers, hubs, switches, gateways, endpoints, or other hardware, software, or embedded logic implementing any number of communication protocols that allow for the exchange of packets in communications system 10. In the illustrated embodiment, LAN 22a includes a plurality of segments 30 that couple endpoints 20a-20g to call manager 24, voice mail system 26, gateway 32, router 34, and communication networks 22b-22d. Specifically, segments 30 couple endpoints 20a-20g to PSTN 22b, public network 22c, and WAN 22d to allow communication with various devices located outside of LAN 22a. Because both audio and/or video telecommunication signals may be communicated over LAN 22a, LAN 22a may eliminate the need, in certain embodiments, for a separate telephone network, such as a private branch exchange (PBX), to provide telecommunication services within a business or other organization.

Although the illustrated embodiment includes four communication networks 22a-22d, the configuration of networks 22a-22d are provided as merely one example configuration of a communications system 10 for establishing communication sessions between and among system components. The term "communication network" should be interpreted as generally including any network capable of transmitting audio and/or video telecommunication signals, data, and/or messages, including signals, data, or messages transmitted through text chat, instant messaging, and e-mail (referred to herein generally as media). Any one of communication networks 22a-22d may be implemented as a LAN, WAN, global distributed network such as the Internet, intranet, extranet, or any other form of wireless or wired communication network. It is generally recognized that communications system 10 may include any combination of networks and that communications system 10 may include fewer or more communication networks 22a-22d as required by the number of endpoints 20 or the desired traffic across communications system 10.

In various embodiments, communications system 10 employs voice communication protocols that allow for the addressing or identification of endpoints, nodes, and/or call managers coupled to communications system 10. For example, LAN 22a may be an Internet Protocol (IP) network or any other type of network that allows each of the components coupled together by LAN 22a in communications system 10 to be identified using IP addresses. IP networks transmit data (including telecommunication data/signals) by placing the data in packets and sending the packets individually to the selected destination. This may be referred to as a packet network. Other types of packet networks include Asynchronous Transfer Mode (ATM), Frame Relay, Ethernet, Systems Network Architecture (SNA), and Synchronous Optical Network (SONET) networks, among others. Unlike a circuit-switched network (e.g., PSTN 22b), dedicated bandwidth is not required for the duration of a communication session over LAN 22a. Instead, each endpoint sends packets as they become available for transmission. In this manner, communications system 10 may support any form and/or combination of point-to-point, multicast, unicast, or other techniques for exchanging VoIP media packets among components in communications system 10. Any network components capable of exchanging audio, video, or other data using frames or packets, are included within the scope of the various embodiments described and claimed herein.

The technology that allows communication signals to be transmitted over an IP network may be referred to as Voice over IP (VoIP). In various embodiments, one or more of endpoints 20a-20g may include an IP telephony device. IP telephony devices have the capability of encapsulating a user's voice (or other inputs) into IP packets so that the voice can be transmitted over LAN 22a (as well as public network 22c and WAN 22d, which may also be packet networks). IP telephony devices may include telephones, fax machines, computers running telephony software, and any other devices capable of performing telephony functions over an IP network.

Call manager 24 controls IP telephony devices within LAN 22a. Call manager 24 is an application that controls call processing, routing, telephony device features and options (such as call hold, call transfer and caller ID), device configuration, and other telephony functions and parameters within communications system 10. When a user wishes to place a call from one telephony device, such as endpoint 20d, to another telephony device, such as endpoint 20e, on LAN 22a, the calling device transmits signaling to call manager 24 indicating the desired function and destination. Call manager 24 then instructs endpoints 20d and 20e to establish a network connection between themselves over LAN 22a. Once endpoints 20d and 20e have established a connection, a codec (coder/decoder) converts the voice or other telecommunication signals generated by the users of endpoints 20d and 20e from analog signals into digital form. Endpoints 20d and 20e may implement the codec either in software or as special-purpose hardware. For example, for a voice communication sent from endpoint 20d to endpoint 20e, the codec in endpoint 20d digitizes the outgoing telecommunication signals. Endpoint 20d then encapsulates the digital telecommunication data within IP packets so that the data can be transmitted over LAN 22a. This encapsulation is typically performed by Real-Time Transport Protocol (RTP) running over UDP/IP (User Datagram Protocol/Internet Protocol). The encapsulation process is well-known in the art, and will not be described in further detail. The IP packets are then transported over LAN 22a via the IP protocol to endpoint 20e and other endpoints participating in the call. A codec in the receiving endpoint 20e then translates the IP packet data into analog voice signals for presentation to the user. This process is repeated each time that a call participant (or other source) generates telecommunication signals.

In addition to intra-LAN telephone calls, calls can also be placed to non-IP telephony devices, such as endpoint 20h, that are connected to PSTN 22b. PSTN 22b includes switching stations, central offices, mobile telephone switching offices, pager switching offices, remote terminals, and other related telecommunications equipment that are located throughout the world. Calls placed to endpoint 20h are made through VoIP-to-PSTN gateway 32. Gateway 32 converts analog or digital circuit-switched data transmitted by PSTN 22b or a PBX to packet data transmitted by LAN 22a, and vice-versa. Gateway 32 also translates between the VoIP call control system protocol and the Signaling System 7 (SS7) or other protocols used in PSTN 22b. For example, when making a call to PSTN endpoint 20h from IP endpoint 20d, the telecommunication signal generated by the user of endpoint 20d is digitized and encapsulated, as described above. The packets are then transmitted over LAN 22a to gateway 32. Gateway 32 converts the data in the packets to the format (either digital or analog) used by PSTN 22b. The voice signals are then sent to the PSTN endpoint 20h over PSTN 22b. This process is continued between LAN 22a and PSTN 22b through gateway 32 until the call is complete. Calls also may be made between IP telephony devices, such as endpoint 20d, and other IP telephony devices located on public network 22c or across WAN 22d. Again, the telecommunication data is digitized and encapsulated into IP packets at the telephony device. However, unlike communications with devices on PSTN 22b, a gateway is not needed to convert the IP packets to another format. A router 34 (or other similar device such as a hub or bridge) directs the packets to the IP address of the receiving IP telephony device.

In an example scenario, a first end user may be associated with a first endpoint 20d, which comprises a telephony device, and a second end user may be associated with a second endpoint 20e, which comprises another telephony device. To initiate a communication session, the first end user may use first endpoint 20d to call the second end user at second endpoint 20e. Where the second end user is participating in a previous call or is otherwise unavailable to take the incoming call from the first end user, call manager 24 may intervene by intercepting the call and forwarding the call to voice mail system 26.

In the following sections, example embodiments of an apparatus and method for handling dynamic payloads in a heterogeneous network are described. The various embodiments illustrated in FIGS. 2-4 and described below are presented in the context of a Session Initiation Protocol (SIP). SIP is a well-known application-layer control (signaling) protocol for creating, modifying, and terminating sessions with one or more participants. It will be apparent to those of ordinary skill in the art that other communication protocols may be similarly used to implement the various embodiments described and claimed herein.

In the various embodiments described below, an H.320/H.323/H.324 to SIP internetworking gateway (e.g., TDM gateway) or SBC can handle dynamic payloads. In a particular embodiment, a requested payload type (PT) is specified in a capabilities message, such as a terminal capabilities set (TCS) message. The PT can be mapped from the SIP offer message along with the list of terminal capabilities (e.g., audio or video capabilities). In another embodiment, a requested PT is specified and enforced in a media establishment message, such as an Open Logical Channel (OLC) acknowledgement (ACK) H.245 message and SDP. In this case, the PT can be mapped from the SIP offer message and answer message along with the negotiated terminal capabilities. In another embodiment, a requested PT is specified using a renegotiation process, such as reINVITE message and/or a Close Logical Channel (CLC)/Open Logical Channel (OLC) message.

In the various embodiments described herein, a requested PT can be specified and enforced in a capabilities message or a media establishment message, thereby providing dynamic payload internetworking in a heterogeneous network. Because no additional messaging is needed to specify the PT in various embodiments, call setup delay is kept to a minimum. Further, various embodiments are useful for all media types including, audio, video, dual-tone multi-frequency (DTMF) signaling, and the like.

Figure 2:
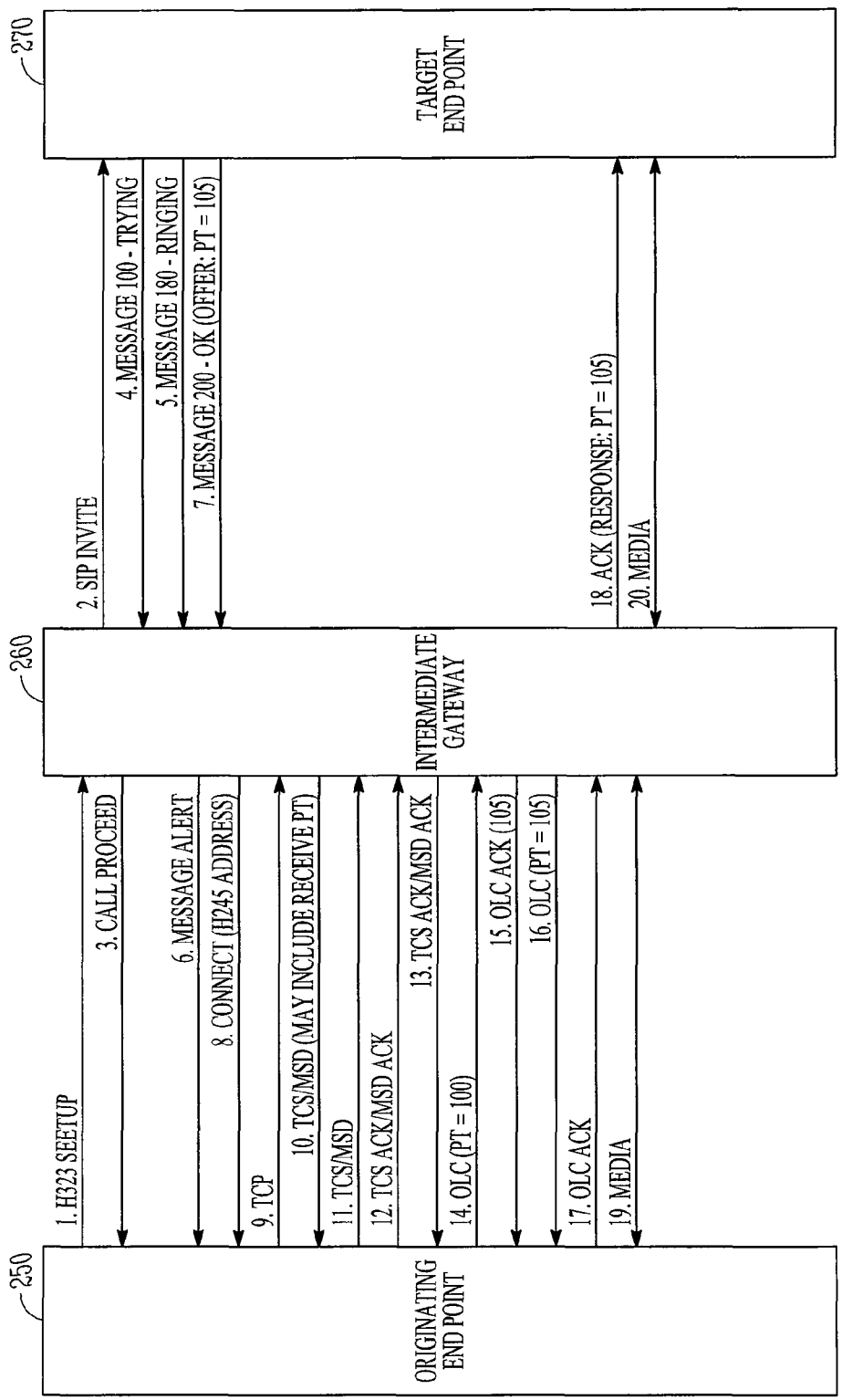
FIGS. 2-4 illustrate various examples of call control processing flows between a plurality of nodes in example embodiments.

Referring to FIG. 2, let us consider the call flow in a first embodiment. As shown in FIG. 2, an originating endpoint node (OEP) 250 is attempting to send a payload to a target endpoint node (TEP) 270 via an intermediate gateway node (IG) 260. In the example of FIG. 2, OEP 250 is using an H.323 protocol and TEP 270 is using a SIP protocol. In this case, IG 260 must convert H.323 messages to SIP messages and vice versa in order to enable communication between OEP 250 and TEP 270. In an initial step, OEP 250 sends an H.323-style Setup message to IG 260 to initiate a call sequence. IG 260 responds by sending a SIP-style INVITE message to the TEP 270, and sending an H.323-style Call Proceed message to the OEP 250 in operation 3. In operation 4, the TEP 270 responds to the SIP Invite message with a Message 100 (Trying) and a Message 180 (Ringing). In operation 6, the IG 260 sends a Message Alert to the OEP 250. In operation 7, TEP 270 configures a message 200 OK to include an offer of a particular payload type. In this case, TEP 270 offers a PT 105. This PT is included in the message 200 OK sent to IG 260. The TEP 270 offer of a payload type indicates that TEP 270 is capable of receiving data payloads of the indicated type, in this case type 105. Upon receiving the message 200 OK with the embedded offer of PT=105, the IG 260 retains the PT offered by the TEP 270. Next, in operation 8, the IG 260 requests a connection with OEP 250 by sending a Connect message and an H.245 address. OEP 250 responds with a transport control protocol (TCP) message in operation 9 to set up a TCP connection with the IG 260, so that capability exchange and media establishment can happen over this connection. In operation 10, the IG 260 sends a TCS, optionally along with the PT received in the SIP offer, and master/slave determination (MSD) message to the OEP 250. In operation 11, the OEP 250 sends a TCS and master/slave determination (MSD) message of its own to the IG 260. In operations 12 and 13, the OEP 250 acknowledges the TCS and MSD message to the IG 260 and the IG 260 acknowledges the TCS and MSD message to the OEP 250. In operation 14, OEP 250 configures an Open Logical Channel (OLC) message. In a particular embodiment, the OLC message is modified to include payload type information (e.g., PT=100). The OLC message with the payload type information is sent to the IG 260. The OEP 250 offer of a payload type indicates that OEP 250 is capable of receiving data payloads of the indicated type, in this case type 100. Upon receiving the OLC message including payload type information, the IG 260 retains the PT offered by the OEP 250. At this point, the IG 260 has received an offered payload type from each of the connected nodes, OEP 250 and TEP 270. If the offered payload types are the same for both endpoints, the IG 260 can proceed with the completion of the call connection and subsequent transfer of media. If the offered payload types are different for both endpoints, as is the case in this example (i.e., OEP offered PT=100 and TEP offered PT=105), the IG 260 must reconcile the differences in the payload type prior to the completion of the call connection and subsequent transfer of media. In the example shown in FIG. 2, the IG 260 can select a payload type (e.g., PT=105) and include the selected payload type in an OLC Acknowledge message and an OLC message sent to the OEP 250 in operations 15 and 16. In response, the OEP 250 can reconfigure itself to communicate using the payload type requested by the IG 260 (in this case, PT=105). If the OEP 250 can so reconfigure itself with the requested payload type, the OEP 250 confirms the use of the requested payload type by sending an OLC Acknowledge message to the IG 260 in operation 17. If the OEP 250 cannot so reconfigure itself, an error condition is flagged. In operation 18, the IG 260 then sends an Acknowledge message to the TEP 270 with an embedded payload type (e.g., PT=105) indicating to the TEP 270 that the offered payload type is accepted by the OEP 250. Now that both the OEP 250 and the TEP 270 are configured to use the same payload type, the media can be transferred between the OEP 250 and the TEP 270 via IG 260 in operations 19 and 20.

Figure 3:
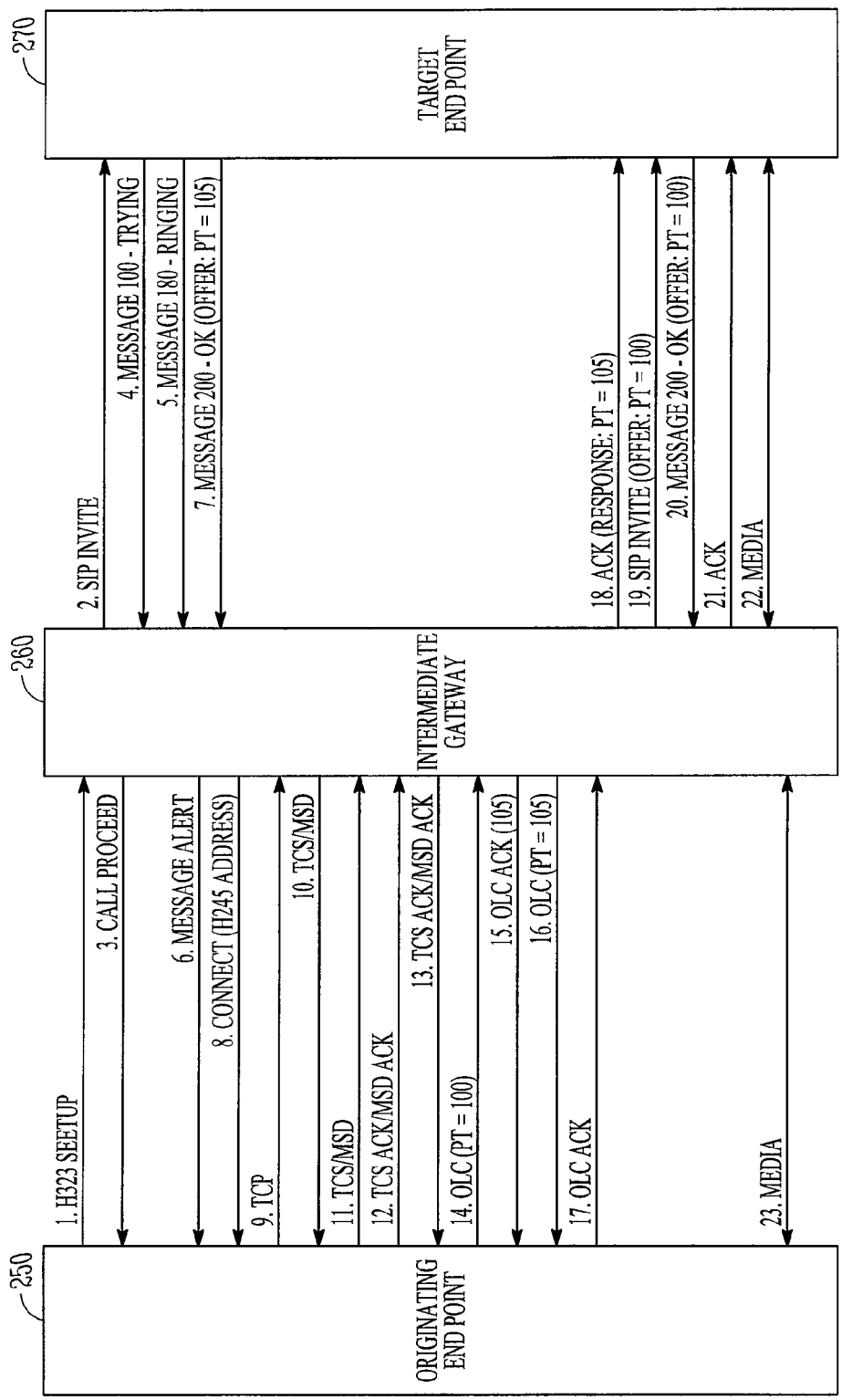

Referring to FIG. 3, let us consider the call flow in a second embodiment. As shown in FIG. 3, an OEP 250 is attempting to send a payload to a TEP 270 via an IG 260. In the example of FIG. 3, OEP 250 is using an H.323 protocol and TEP 270 is using a SIP protocol. In this case, IG 260 must convert H.323 messages to SIP messages and vice versa in order to enable communication between OEP 250 and TEP 270. In the example of FIG. 3, communications between IG 260 and the OEP 250 on one side, and between IG 260 and the TEP 270 on the other side, proceed from operations 1-14 as described above in connection with FIG. 2. In operation 14 shown in FIG. 3, OEP 250 configures an Open Logical Channel (OLC) message. In a particular embodiment, the OLC message is modified to include payload type information (e.g., PT=100). The OLC message with the payload type information is sent to the IG 260. The OEP 250 offer of a payload type indicates that OEP 250 is capable of receiving data payloads of the indicated type, in this case type 100. Upon receiving the OLC message including payload type information, the IG 260 retains the PT offered by the OEP 250. At this point, the IG 260 has received an offered payload type from each of the connected nodes, OEP 250 and TEP 270. Because in the example of FIG. 3, the offered payload types are different for both endpoints (i.e., OEP offered PT=100 and TEP offered PT=105), the IG 260 must reconcile the differences in the payload type prior to the completion of the call connection and subsequent transfer of media. In the example shown in FIG. 3, the IG 260 can select a payload type (e.g., PT=100) offered by the OEP 250 and respond to the OEP 250 with an OLC Acknowledge message in operation 15. The IG 260 can also include the selected payload type in an OLC message sent to the OEP 250 in operation 16. The OEP 250 can respond with an OLC Acknowledge message in operation 17. At this point, the IG 260 has established a connection with the OEP 250 and agreed to process payloads from OEP 250 of a payload type=100. In operation 18, IG 260 configures a SIP Acknowledge message modified to include a payload type (e.g., PT=105) and sends the modified Acknowledge message to TEP 270. In operation 19, IG 260 configures a SIP Invite message modified to include a payload type (e.g., PT=100) as offered by the OEP 250, and sends the modified SIP Invite message to TEP 270. In response, the TEP 270 can reconfigure itself to communicate using the payload type requested by the IG 260 (in this case, PT=100). If the TEP 270 can so reconfigure itself with the requested payload type, the TEP 270 confirms the use of the requested payload type by sending a SIP message 200 OK, modified to include the requested payload type (e.g., PT=100), to the IG 260 in operation 20. If the TEP 270 cannot so reconfigure itself, an error condition is flagged. In operation 21, the IG 260 then sends an Acknowledge message to the TEP 270. Now that both the OEP 250 and the TEP 270 are configured to use the same payload type, the media can be transferred between the OEP 250 and the TEP 270 via IG 260 in operations 22 and 23.

Figure 4:
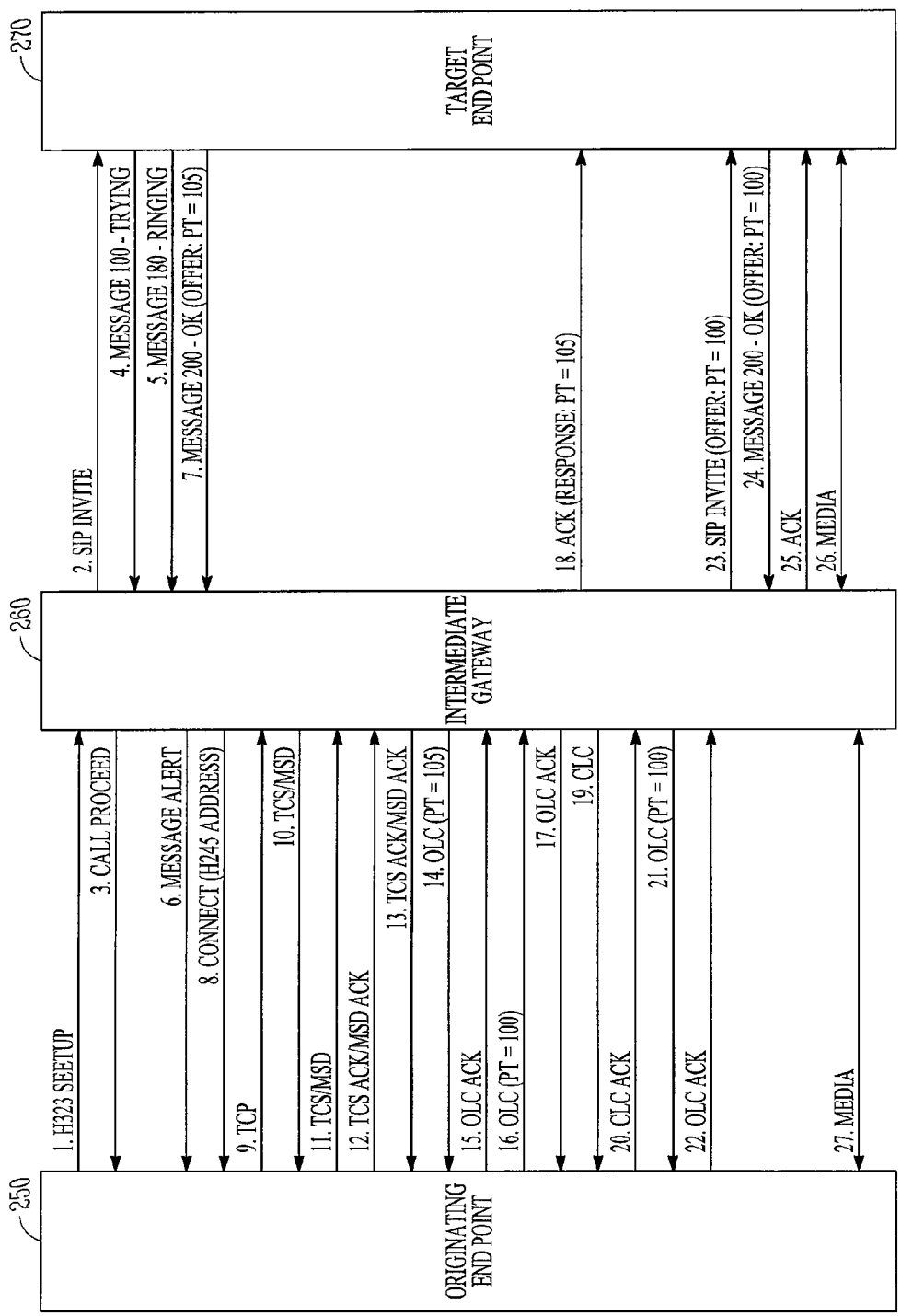

Referring to FIG. 4, let us consider the call flow in a third embodiment. As shown in FIG. 4, an OEP 250 is attempting to send a payload to a TEP 270 via an IG 260. In the example of FIG. 4, OEP 250 is using an H.323 protocol and TEP 270 is using a SIP protocol. In this case, IG 260 must convert H.323 messages to SIP messages and vice versa in order to enable communication between OEP 250 and TEP 270. In the example of FIG. 4, communications between IG 260 and the OEP 250 on one side, and between IG 260 and the TEP 270 on the other side, proceed from operations 1-13 as described above in connection with FIGS. 2 and 3. As shown in FIG. 4 at operation 13, the IG 260 acknowledges the TCS and MSD message to the OEP 250. In operation 14, the IG 260 configures an OLC message. In a particular embodiment, the OLC message is modified to include the payload type information (e.g., PT=105) offered by the TEP 270. The modified OLC message with the payload type information is sent to the OEP 250. In response, the OEP 250 can send an OLC Acknowledge message back to the IG 260 at operation 15. Additionally, the OEP 250 can configure its own OLC message modified to include the payload type information (e.g., PT=100) offered by OEP 250. In this case, the offer of a payload type from the OEP 250 indicates that OEP 250 is capable of receiving data payloads of type 100. In this manner, the OEP 250 can renegotiate with the IG 260 for use of a different payload type than the payload type offered by the IG 260 and/or the TEP 270. The modified OLC message is sent to the IG 260 in operation 16. Upon receiving the OLC message modified to include payload type information (e.g., PT=100), the IG 260 retains the PT offered by the OEP 250. At this point, the IG 260 has received an offered payload type from each of the connected nodes, OEP 250 and TEP 270. If the offered payload types are the same for both endpoints, the IG 260 can proceed with the completion of the call connection and subsequent transfer of media. However, if the offered payload types are different for both endpoints, as is the case in this example (i.e., OEP 250 offered PT=100 and TEP 270 offered PT=105), the IG 260 must reconcile the differences in the payload type prior to the completion of the call connection and subsequent transfer of media. In the example described above and shown in FIG. 3, the IG 260 can select a payload type (e.g., PT=100) offered by the OEP 250 and respond to the OEP 250 with an OLC Acknowledge message at operation 17. In operation 18, the IG 260 can send an Acknowledge message to the TEP 270 with the payload type (PT=105) offered earlier by the TEP 270. In the example of FIG. 4, the IG 260 can also send a Close Logical Channel (CLC) message to the OEP 250 in operation 19. In response, the OEP 250 acknowledges the CLC message with a CLC Acknowledge message sent to the IG 260 at operation 20. Next, the IG 260 configures an OLC message to include a selected payload type, in this example, PT=100, and sends the modified OLC message to the OEP 250 in operation 21. The OEP 250 can respond with an OLC Acknowledge message in operation 22. At this point, the IG 260 has established a connection with the OEP 250 and agreed to process payloads from OEP 250 of a payload type=100. In operation 18, IG 260 configures a SIP Acknowledge message modified to include a payload type (e.g. PT=105) and sends the modified Acknowledge message to TEP 270. In operation 23, IG 260 configures a SIP Invite message modified to include a payload type (e.g. PT=100) as offered by the OEP 250 and sends the modified SIP Invite message to TEP 270. In response, the TEP 270 can reconfigure itself to communicate using the payload type requested by the IG 260 (in this case, PT=100). If the TEP 270 can so reconfigure itself with the requested payload type, the TEP 270 confirms the use of the requested payload type by sending a SIP message 200 OK, modified to include the requested payload type (e.g., PT=100), to the IG 260 in operation 24. If the TEP 270 cannot so reconfigure itself, an error condition is flagged. In operation 25, the IG 260 then sends an Acknowledge message to the TEP 270. Now that both the OEP 250 and the TEP 270 are configured to use the same payload type, the media can be transferred between the OEP 250 and the TEP 270 via IG 260 in operations 26 and 27.

Figure 5:
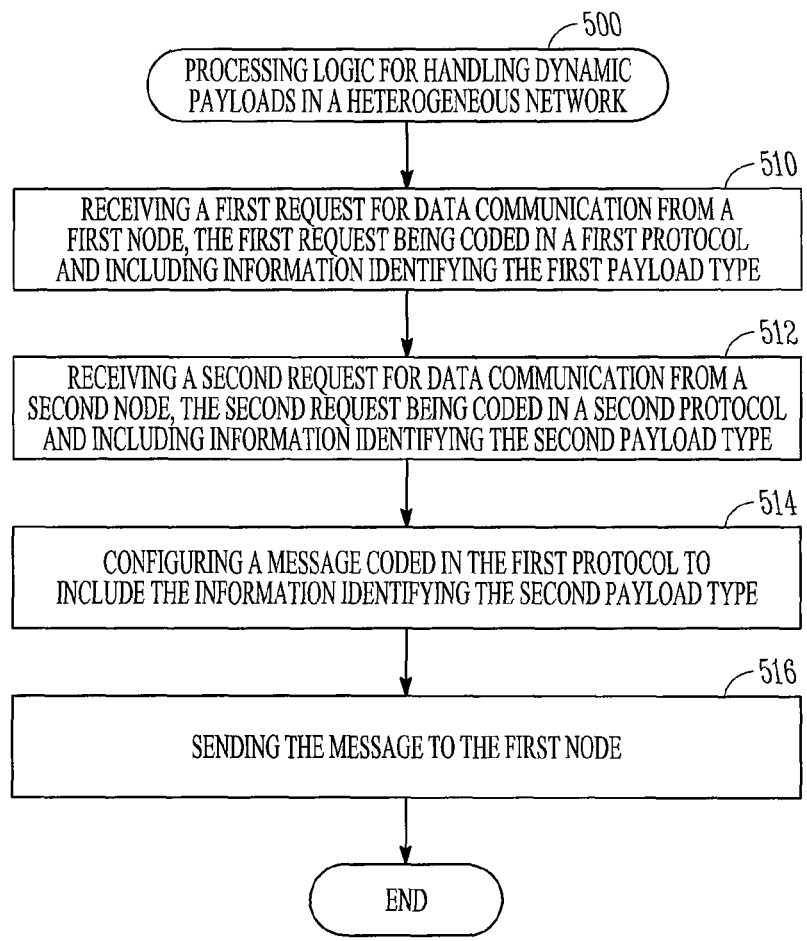
FIG. 5 is a flow diagram illustrating the processing flow for a particular example embodiment.

FIG. 5 is a flow diagram illustrating the basic processing flow for a particular embodiment. As shown, an example embodiment is configured for receiving a first request for data communication from a first node, the first request being coded in a first protocol and including information identifying a first payload type (processing block 510). The example embodiment is further configured for receiving a second request for data communication from a second node, the second request being coded in a second protocol and including information identifying a second payload type (processing block 512). The example embodiment is further implemented for configuring a message coded in the first protocol to include the information identifying the second payload type (processing block 514). The example embodiment is further configured for sending the message to the first node (processing block 516).

Various embodiments provide an apparatus and method for handling dynamic payloads in a heterogeneous network. An example embodiment includes a first node interface to receive a first request for data communication from a first node, the first request being coded in a first protocol and including information identifying a first payload type; a second node interface to receive a second request for data communication from a second node, the second request being coded in a second protocol and including information identifying a second payload type; and the first node interface to configure a message coded in the first protocol to include the information identifying the second payload type and to send the message to the first node.

Figure 6:
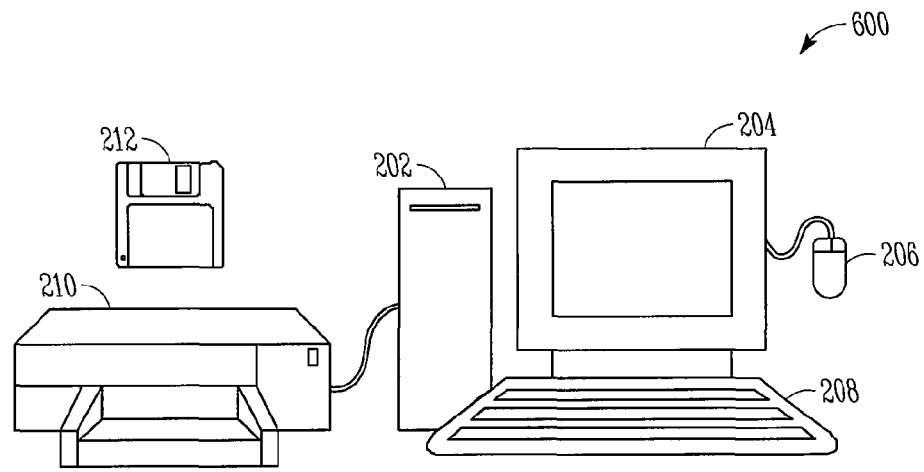
FIGS. 6 and 7 illustrate an example of a computer system on which processing for various embodiments can be implemented.
Figure 7:
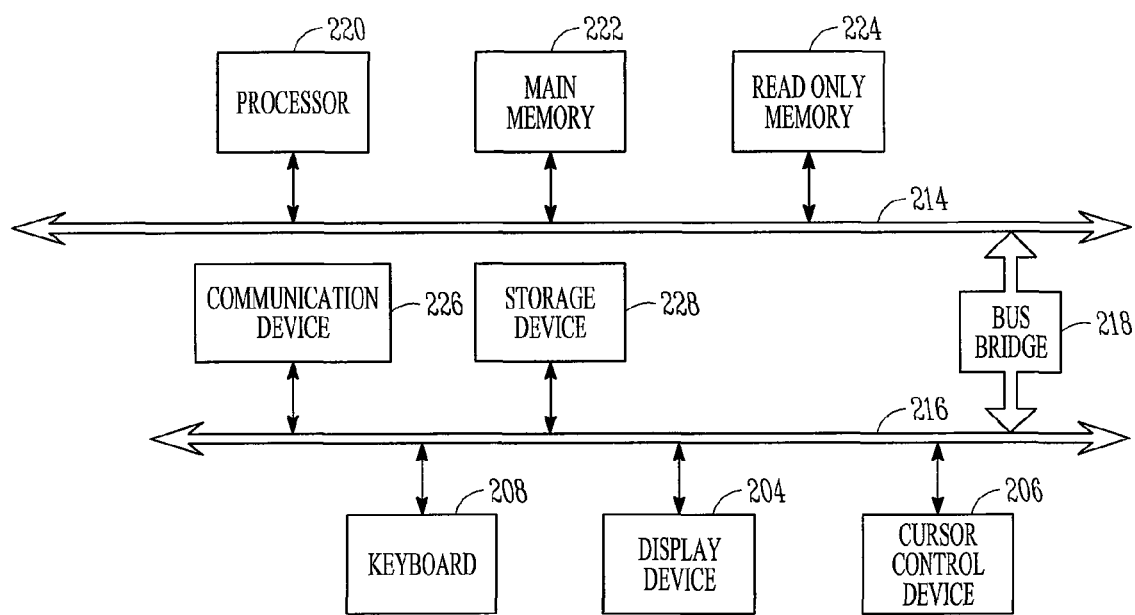

Having described above various embodiments of the network environment in which embodiments may operate, FIGS. 6 and 7 show an example of a computer system 600 illustrating an exemplary host, gateway, network node, or endpoint computer system, in which the features of an example embodiment may be implemented. Computer system 600 is comprised of a bus or other communications means 214 and 216 for communicating information, and a processing means such as processor 220 coupled with bus 214 for processing information. Computer system 600 further comprises a random access memory (RAM) or other dynamic storage device 222 (commonly referred to as main memory)

coupled to bus 214 for storing information and instructions to be executed by processor 220. A machine-readable medium 212 may also be used for storing information and instructions. Main memory 222 may also be used for storing temporary variables or other intermediate information during execution of instructions by processor 220. Computer system 600 also comprises a read only memory (ROM) and/or other static storage device 224 coupled to bus 214 for storing static information and instructions for processor 220.

An optional data storage device 228 such as a magnetic disk or optical disk and its corresponding drive may also be coupled to computer system 600 for storing information and instructions. Computer system 600 can also be coupled via bus 216 to a display device 204, such as a cathode ray tube (CRT) or a liquid crystal display (LCD), for displaying information to a computer user. For example, image, textual, video, or graphical depictions of information may be presented to the user on display device 204. Typically, an alphanumeric input device (e.g. keyboard device) 208, including alphanumeric and other keys, is coupled to bus 216 for communicating information and/or command selections to processor 220. Another type of user input device is cursor control device 206, such as a conventional mouse, trackball, or other type of cursor direction keys, for communicating direction information and command selection to processor 220 and for controlling cursor movement on display device 204.

Alternatively, the computer system 600 can be implemented as a network computer or thin client device. Computer system 600 may also be a laptop or palm-top computing device, such as the Palm Pilot™. Computer system 600 could also be implemented in a robust cellular telephone, where such devices are currently being used with Internet microbrowsers. Such a network computer or thin client device does not necessarily include all of the devices and features of the above-described exemplary computer system; however, the functionality of an example embodiment or a subset thereof may nevertheless be implemented with such devices.

A communication device 226 is also coupled to bus 216 for accessing remote computers or servers via the Internet, for example. The communication device 226 may include a modem, a network interface card, or other well-known interface devices, such as those used for interfacing with Ethernet, Token-ring, or other types of networks. In any event, in this manner, the computer system 600 may be coupled to a number of servers via a conventional network infrastructure such as the infrastructure illustrated and described above.

The system of an example embodiment includes software, information processing hardware, and various processing steps, which are described above. The features and process steps of example embodiments may be embodied in machine or computer-executable instructions. The instructions can be used to cause a general purpose or special purpose processor that is programmed with the instructions to perform the steps of an example embodiment. Alternatively, the features or steps may be performed by specific hardware components that contain hard-wired logic for performing the steps, or by any combination of programmed computer components and custom hardware components. While embodiments are described with reference to the Internet, the method and apparatus described herein is equally applicable to other network infrastructures or other data communications systems.

Various embodiments are described. In particular, the use of embodiments with various types and formats of data structures may be described. It will be apparent to those of ordinary skill in the art that alternative embodiments of the implementations described herein can be employed and still fall within the scope of the claimed invention. In the detail herein, various embodiments are described as implemented in computer-implemented processing logic denoted sometimes herein as the "Software". As described above, however, the claimed invention is not limited to a purely software implementation.

The software and/or data described herein may further be transmitted or received over a network 22a-d via the communication device 226 utilizing any one of a number of well-known transfer protocols, for example, the hyper text transfer protocol (HTTP). While the machine-readable medium 212 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the disclosed subject matter, or that is capable of storing, encoding, or carrying data structures utilized by or associated with such a set of instructions. The term "machine-readable medium" shall accordingly be taken to include, but not be limited to, solid-state memories, optical and magnetic media, and carrier wave signals.

Although the present specification describes components and functions implemented in the embodiments with reference to particular standards and protocols, the disclosed subject matter may be not limited to such standards and protocols. Each of the standards for Internet and other packet-switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

Thus, as described above, an apparatus and method for handling dynamic payloads in a heterogeneous network is disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

We claim:

1. A method comprising:
    receiving a first request for data communication from a first node, the first request being coded in a first protocol, the first request being modified to include information identifying a first payload type;
    receiving a second request for data communication from a second node, the second request being coded in a second protocol, the second request being modified to include information identifying a second payload type;
    configuring a first message coded in the first protocol to include the information identifying the second payload type, the first message being an Open Logical Channel (OLC) message;

sending the first message to the first node to ascertain a capability of the first node to process the second payload type; and receiving a first response to the first message from the first node, the first response being sent by the first node as a response to receiving the first message and including information indicative of whether the first node can process a payload of the second payload type.

2. The method as claimed in claim 1 wherein the first protocol is H.323 protocol.

3. The method as claimed in claim 1 wherein the first protocol is Session Initiation Protocol (SIP) protocol.

4. An apparatus comprising:
   means for receiving a first request for data communication from a first node, the first request being coded in a first protocol, the first request being modified to include information identifying a first payload type;
   means for receiving a second request for data communication from a second node, the second request being coded in a second protocol, the second request being modified to include information identifying a second payload type;
   means for configuring a first message coded in the first protocol to include the information identifying the second payload type, the first message being an Open Logical Channel (OLC) message;
   means for sending the first message to the first node to ascertain a capability of the first node to process the second payload type; and
   means for receiving a first response to the first message from the first node, the first response being sent by the first node as a response to receiving the first message and including information indicative of whether the first node can process a payload of the second payload type.

5. The apparatus as claimed in claim 4 wherein the first protocol is H.323 protocol.

6. The apparatus as claimed in claim 4 wherein the first protocol is Session Initiation Protocol (SIP) protocol.

7. An intermediate gateway apparatus comprising:
   a first node interface to receive a first request for data communication from a first node, the first request being coded in a first protocol, the first request being modified to include information identifying a first payload type;
   a second node interface to receive a second request for data communication from a second node, the second request being coded in a second protocol, the second request being modified to include information identifying a second payload type; and
   the first node interface to configure a first message coded in the first protocol to include the information identifying the second payload type, the first message being an Open Logical Channel (OLC) message, to send the first message to the first node to ascertain a capability of the first node to process the second payload type, and to receive a first response to the first message from the first node, the first response being sent by the first node as a response to receiving the first message and including information indicative of whether the first node can process a payload of the second payload type.

8. The apparatus as claimed in claim 7 wherein the first protocol is H.323 protocol.

9. The apparatus as claimed in claim 7 wherein the first protocol is Session Initiation Protocol (SIP) protocol.

10. A system comprising a plurality of network elements including an originating endpoint, an intermediate gateway and a target endpoint, the intermediate gateway including:
    a first node interface to receive a first request for data communication from a first node, the first request being coded in a first protocol, the first request being modified to include information identifying a first payload type;
    a second node interface to receive a second request for data communication from a second node, the second request being coded in a second protocol, the second request being modified to include information identifying a second payload type; and
    the first node interface to configure a first message coded in the first protocol to include the information identifying the second payload type, the first message being an Open Logical Channel (OLC) message, to send the first message to the first node to ascertain a capability of the first node to process the second payload type, and to receive a first response to the first message from the first node, the first response being sent by the first node as a response to receiving the first message and including information indicative of whether the first node can process a payload of the second payload type.

11. The system as claimed in claim 10 wherein the first protocol is H.323 protocol.

12. The system as claimed in claim 10 wherein the first protocol is Session Initiation Protocol (SIP) protocol.

* * * * *